(No Model.)
L. W. HOLLAND.
CUTTER BAR.
No. 439,276. Patented Oct. 28, 1890.
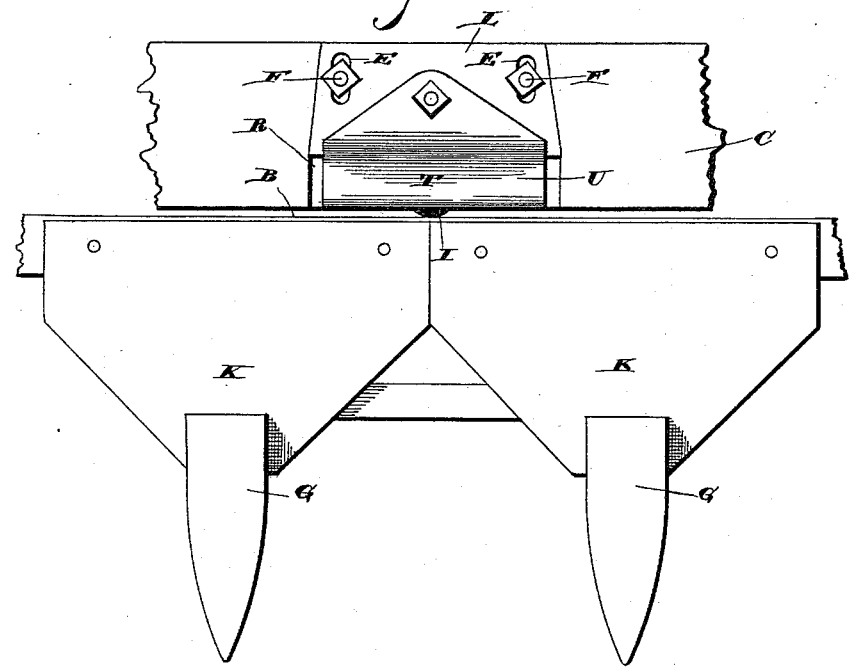
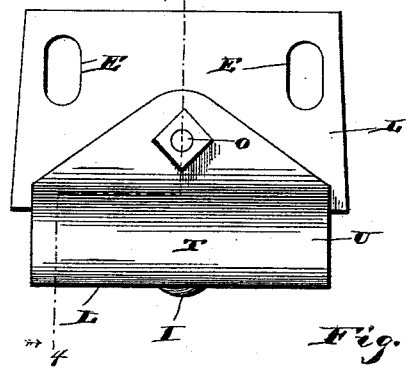
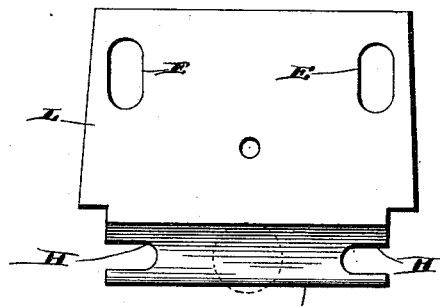
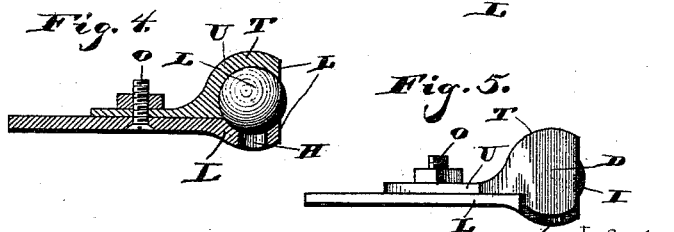
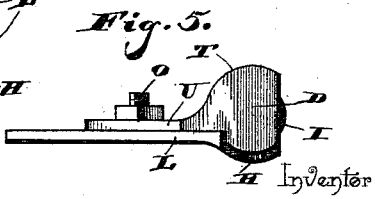
Witnesses
Samuel Ker.
Inventor
Luther W. Holland.
By his Attorneys,
N. L. Collamer
C. A. Snow & Co.

UNITED STATES PATENT OFFICE.

LUTHER W. HOLLAND, OF FULTON, MISSOURI, ASSIGNOR OF ONE-HALF TO JAMES McGWIN, OF SAME PLACE.

CUTTER-BAR.

SPECIFICATION forming part of Letters Patent No. 439,276, dated October 28, 1890.

Application filed April 21, 1890. Serial No. 348,763. (No model.)

*To all whom it may concern:*

Be it known that I, LUTHER W. HOLLAND, a citizen of the United States, residing at Fulton, in the county of Callaway and State of Missouri, have invented a new and useful Cutter-Bar, of which the following is a specification.

This invention relates to reapers, and more especially to anti-friction devices between the finger-bar and the cutter-bar thereof, and the object of the invention is to provide improved means for reducing the friction heretofore existing between these parts.

To this end the invention consists of a socket detachably and adjustably secured to the finger-bar in rear of the cutter-bar and a ball located in said socket and revolving against the rear edge of said cutter-bar, all as hereinafter more fully described, and illustrated in the drawings, in which—

Figure 1 is a plan view of a section of a cutting apparatus with this improved anti-friction device in place thereon. Fig. 2 is a plan view of the socket detached. Fig. 3 is a plan view of the lower member thereof, the ball being shown in dotted lines. Fig. 4 is a longitudinal section through the complete socket on the line 4 4 of Fig. 2. Fig. 5 is an end view of the socket.

Heretofore friction devices have been patented and manufactured wherein a ball was used in substantially the same manner as in the present instance; but the objection arose that the slot in the socket in which the ball reciprocated soon became filled with pieces of cut grass, sticks, stones, dirt, and other extraneous matter, and the movements of the ball to and fro were impeded, and the present invention is designed to overcome this objection. In this case, also, the socket which holds the ball is made in two parts connected detachably, whereby the ball can be replaced by another when it becomes worn, and the entire socket is adjustable forward and back upon the finger-bar.

Referring to the said drawings, the letter C designates the finger-bar, to which is connected the guard-fingers G, each having a notch in its upper face, in which the cutter-bar B reciprocates, the knives K moving through the guards G, as will be readily understood.

Coming now to the present invention, the finger-bar C is provided at suitable points throughout its length with recesses R in its front edge, and in these recesses fit sockets containing my improved anti-friction devices. Each socket is formed in two pieces—an upper member U and a lower member L—these members being connected by a bolt O or by the same bolts which secure the sockets to the finger-bar, although I have found an independent bolt preferable, as shown. When so constructed, the lower member L is provided with elongated slots E, through which pass fastening-bolts F, which also pass through holes in the cutter-bar. By this means the sockets are secured to the finger-bar, but can be adjusted forward and back thereon, as occasion may require, and to take up wear on the parts. The ends of the upper member are turned, as at D, and its body between said ends is turned up, as at T, whereby a slot is formed between the front edges of the two members, which, however, are in vertical alignment. The extreme edges of the two members are turned toward each other into lips L, as shown in Fig. 4, and the lower member near each end is provided with a hole H, as shown. In the socket thus formed between the front ends of the two members is placed a ball I, of steel or iron or other suitable hard metal, its size being such that it will move freely therein from end to end and in rear of the lips L, and yet cannot be displaced. The parts of the cutting apparatus being assembled and the machine put in motion, the rear edge of the cutter-bar B reciprocates rapidly against the balls I in the several sockets throughout the length of the finger-bar, and said sockets can be adjusted forward and back to impart the desired degree of friction to the said bar. As the balls or the bar wear, the sockets are set farther forward, as will be obvious. What dirt or extraneous matter may enter the sockets will pass out the holes H therein as the ball moves from one end to the other and carries the dirt to them. The sockets can be removed at any time and replaced by others, or the upper member of any socket can be removed when it is desired to have access to the interior thereof, as for the purpose of replacing a broken or worn ball.

I claim as the salient points of this invention—

1. The combination, with the finger-bar, of the sockets secured thereto in rear of the cutter-bar, each of said sockets comprising two members detachably connected, and an anti-friction ball therein, substantially as described.

2. The combination, with the finger-bar, of the sockets secured thereto in rear of the cutter-bar, each of said sockets comprising an upper member U, having an upwardly-bent front end T with turned-down ends D, a lower member having holes H through its body near each end, inwardly-turned lips L on each member, an anti-friction ball I between said members, and a bolt O connecting them, substantially as described.

3. The combination, with the finger-bar, of the sockets secured thereto in rear of the cutter-bar, each of said sockets comprising an upper member U, having an upwardly-bent front end T with turned-down ends D, a lower member, inwardly-turned lips L on each member, an anti-friction ball I between said members, and a bolt O connecting them, substantially as described.

4. The combination, with the finger-bar, of the sockets secured thereto in rear of the cutter-bar, each of said sockets comprising an upper member U, a lower member having holes H through its body near each end, an anti-friction ball I between said members, and a bolt O connecting them, substantially as described.

In testimony that I claim the foregoing as my own I have hereto affixed my signature in presence of two witnesses.

LUTHER W. HOLLAND.

Witnesses:
B. P. BAILEY,
GEO. W. PENN.